Jan. 15, 1957  A. MAZZOLA  2,777,292
ELECTRICALLY DRIVEN TURBINE TYPE FLUID COUPLING UNIT
Filed March 10, 1952
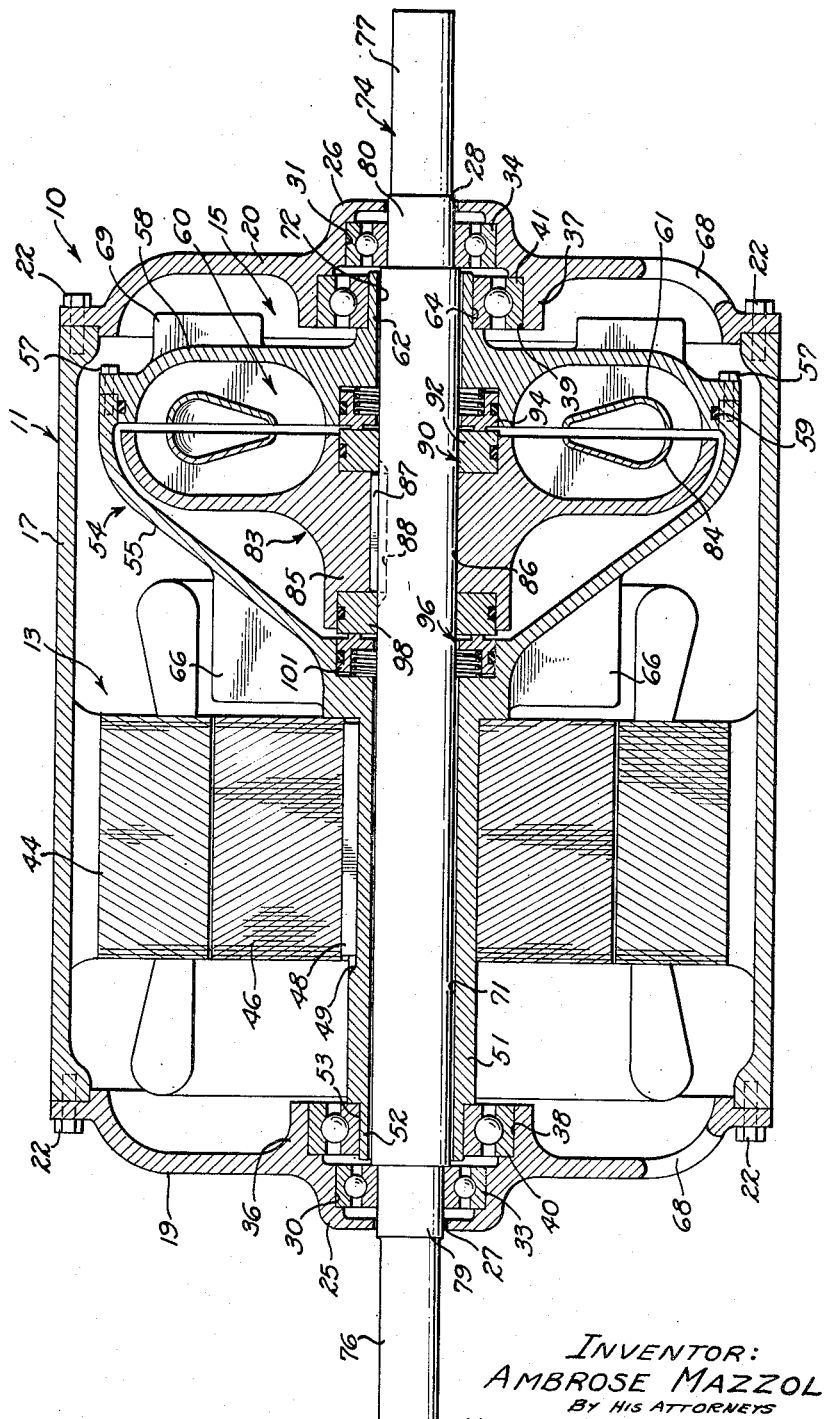
INVENTOR:
AMBROSE MAZZOLA
BY HIS ATTORNEYS
HARRIS, KIECH, FOSTER & HARRIS United States Patent Office 2,777,292
Patented Jan. 15, 1957

2,777,292

ELECTRICALLY DRIVEN TURBINE TYPE FLUID COUPLING UNIT

Ambrose Mazzola, South Gate, Calif., assignor to Angelus Engineering Corporation, South Gate, Calif., a corporation of California Application March 10, 1952, Serial No. 275,845

9 Claims. (Cl. 60—54)

This invention relates to a power unit which consists of a drive motor operatively connected to an impositively coupled transmission.

In describing my invention, the drive motor is exemplified as an electric motor but it is, of course, obvious that various types of drive motors, such as small gasoline motors, hydraulic motors, or other conventional power plants, could supplant the electric motor described. The transmission unit of the power unit is described as embodied in a fluid coupled transmission, but it is within the scope of the invention that any transmission unit which includes driving and driven means impositively coupled to each other be utilized.

One of the major difficulties encountered in power units of the type under consideration is the fact that they are frequently of considerable bulk for the power output thereof, necessitating the incorporation of complicated means for interconnecting the drive motor to the transmission unit which occupies considerable space and necessitates the provision of a relatively large housing to enclose the same.

It is, therefore, an object of my invention to provide a power unit which consists of an electric motor and a fluid coupled transmission which are enclosed in a housing somewhat, but only slightly, larger than the conventional housing of the electric motor to provide a power unit which is highly flexible in application and not so large as to prevent its utilization in applications where a motor of the same size would ordinarily be utilized.

In conventional power units of the type under consideration, in order to provide a minimum size housing for the drive motor and the transmission unit, the motor is axially arranged with the transmission unit, the drive shaft thereof being coupled directly to the driving member of the transmission unit, the driven member of the transmission unit being impositively coupled to the driving member thereof and being mounted on a driven shaft which projects from one end of the housing of the power unit. The inherent limitations of such constructions are obvious. Since only one shaft is available, it is not possible to drive from both ends of the housing as is possible with conventional electric motors.

Another object of my invention is the provision of a power unit which includes an axially arranged drive motor and driven transmission unit enclosed within a housing of minimum dimensions, said housing having a driven shaft whose ends project from opposite sides of the housing, both ends being available for driving mechanisms associated with the power unit, or one end being available for driving purposes while the other end has associated therewith a positively actuable brake mechanism designed to immediately halt the rotation of the driven member of the transmission unit to permit the complete control of a mechanism which is operatively coupled to the driven shaft of the power unit.

An additional object of my invention is the provision of a power unit of the aforementioned character which includes an electric drive motor having a drive shaft and a fluid coupled transmission having a housing which is secured positively to said drive shaft, said housing mounting a driving member and being fluidly coupled to a driven member which is positively connected to a driven shaft through which power is transmitted to machines or other devices associated with the power unit.

A further object of my invention is the provision of a power unit of the aforementioned type in which the drive shaft of the electric motor is hollow and in which the driven shaft of the transmission unit projects from both ends of said unit, one end of the drive shaft projecting through the driven member of the unit, and the other end of the driven shaft projecting through the drive shaft of the electric motor to provide a double ended driven shaft for the aforementioned desirable purposes.

Another object of my invention is the provision of a power unit of the aforementioned character in which a portion of the housing of the transmission unit is integrally formed with the drive shaft of the electric motor, thus providing a rotatable housing for the fluid coupled transmission which is designed to be rotated simultaneously with and at the same speed as the drive shaft of the electric motor.

An additional object of my invention is the provision of a power unit of the aforementioned character in which the rotatable housing of the transmission unit thereof is provided on its exterior with a plurality of vanes designed to accomplish the cooling of the transmission unit and the electric motor associated therewith by directing a continual stream of cooling air over said housing and said electric motor.

A further object of my invention is the provision of a power unit of the aforementioned character in which the drive motor and transmission unit are enclosed in a minimum size housing, the housing providing bearing means for the driven shaft of the transmission unit, and bearing means for separately supporting the drive shaft of the electric motor associated therewith.

Another object of my invention is the provision of a power unit of the aforementioned character in which the transmission unit includes first sealing means interposed between the driving and driven members of the transmission unit to seal the fluid coupling media therefrom the driven shaft of said unit, said sealing means being interposed between the opposed faces of said driving and driven members of said unit.

An additional object of my invention is the provision of a power unit of the aforementioned character in which the transmission unit thereof is provided with second sealing means interposed between a portion of the interior of the rotatable housing and the driven member of the unit.

A further object of my invention is the provision of a power unit which can be easily and quickly assembled and disassembled, which is enclosed in a housing only slightly larger than the housing which would ordinarily enclose the drive motor of the power unit itself, and which is characterized by extreme simplicity of construction and operation.

Other objects and advantages of my invention will be apparent from the following specification and the accompanying drawing, which illustrates a preferred embodiment of a power unit constructed in accordance with my invention.

Referring to the drawing, I show a power unit 10 constructed in accordance with my invention, said power unit including a housing 11 which has incorporated therein an electric drive motor 13 and a fluid coupled transmission unit 15. The housing 11 of the power unit 10 is extremely compact, but slightly larger in over-all dimensions than the housing conventionally provided for electric motors of the power rating of the electric motor 13 incorporated in said housing. The housing 11 is constituted by a main body portion 17 of substantially cylindrical, transverse, cross section which has fastened to the opposite ends thereof, end bells 19 and 20, respectively, said end bells being secured to the main body portion 17 by means of bolts 22. The ends 19 and 20 are provided with integrally formed, protruding bearing caps 25 and 26, respectively, said caps having openings 27 and 28 formed therein.

Disposed in annular seats 30 and 31 provided in the bearing caps 25 and 26, respectively, are ball bearings 33 and 34, the openings in the inner races of said bearings being aligned with the openings 27 and 28 in the bearing caps 25 and 26.

Formed integrally with and projecting from the interiors of the end bells 19 and 20, respectively, are instruck, annular flanges 36 and 37 which provide annular bearing seats 38 and 39 for supporting second ball bearings 40 and 41, respectively. It will be noted that the openings in the inner races of the bearings 40 and 41 are axially aligned with the openings of the inner races of the bearings 33 and 34, but that the diameters of the openings in the inner races of the bearings 40 and 41 are substantially greater than the diameters of the openings in the inner races of the bearings 33 and 34.

Secured to the interior of the main body portion 17 of the housing 11 of the power unit 10, adjacent one end thereof, is the field coil 44 of the electric drive motor 13, said field coil having disposed in the center thereof a conventional rotatable armature structure 46. The armature structure 46 is positively secured, as by means of a key 48 and a keyway 49, on a drive shaft 51, the drive shaft 51 having a necked down portion 52 at one end thereof which provides a journal 53 receivable in the opening in the inner race of the roller bearing 40, thus supporting said one end of the drive shaft 51 for rotation in the end bell 19.

The housing 54 of the transmission unit 15 is constituted, in part, by a housing segment 55 formed integrally with the end of the drive shaft 51 opposite that journaled in the bearing 40. Thus, the rotation of the drive shaft 51 causes the concomitant rotation of the housing segment 55 at the same speed as that of the drive shaft. Secured to the annular end of the housing segment 55, as by means of bolts 57, is the other portion 58 of the housing 54. An annular seal 59 is provided between adjacent surfaces of the portion 58 and the segment 55 of the housing 54 to prevent the leakage of hydraulic fluid disposed within said housing and adapted to act as a coupling medium therein.

Formed integrally with, or otherwise suitably positively secured to, the interior of the other portion 58 of the housing 54 of the transmission unit 15, is a driving member of the transmission unit 15, indicated generally at 60, and constituted by a plurality of circumferentially spaced vanes 61. A centrally located boss 62 on the other portion 58 of the housing 54 provides a journal 64 which is receivable in the opening in the bearing 41. Therefore, the housing 54 is rotated as a unit on and by the drive shaft 51, the rotation of said drive shaft causing the concomitant rotation of the driving member 60 secured to the interior of the housing 54 at the same speed as the drive shaft.

Formed on the exterior of the housing segment 55 is a plurality of vanes 66 which are disposed internally of the field coil 44 and are designed to cause a flow of cooling air over the electric motor 13, inlet and exit openings 68 being provided in the end bells 19 and 20 of the housing 11 of the power unit 10. Vanes 69 are also provided on the exterior of the other portion 58 of the housing 54 of the transmission unit 15 and serve to supplement the circulating function of the previously described vanes 66.

An elongated bore 71 is formed in the interior of the drive shaft 51 and is co-axially oriented with a similar bore 72 formed in the diametrical center of the boss 62 of the other portion 58 of the housing 54, the bores 71 and 72 being axially oriented on the same axis to provide a passage between the openings 27 and 28 in the end bells 19 and 20 of the housing 11. Disposed in the bores 71 and 72 is an elongated driven shaft 74 whose opposite ends 76 and 77 project, respectively, from the openings 27 and 28 in the end bells 19 and 20 of the housing 11 of the power unit 10, said driven shaft being provided with journals 79 and 80 which are received, respectively, in the openings in the inner races of the roller bearings 33 and 34 to support the driven shaft 74 on the end bells 19 and 20 of the housing 11, and to maintain said driven shaft for rotation therein. It will be noted that the opposite ends 76 and 77 of the driven shaft project beyond the ends of the housing 11 thus permitting the opposite ends of the driven shaft to be utilized to simultaneously drive a plurality of driven devices, or to permit the mounting of brake means on one end of the shaft so that the energization of a mechanism driven by the other end of the drive shaft may be accurately controlled. This is an important feature of my invention.

Disposed in the housing 54 of the transmission unit 15 and juxtaposed to the drive member 60 is a driven member 83, said driven member including a plurality of circumferentially arranged vanes 84 which are fluidly coupled to vanes 61 of the drive member 60 by fluid, not shown, provided in the interior of the housing 54 of the transmission unit 15. The driven member 83 is provided with an elongated, centrally located portion 85 which has an elongated bore 86 therethrough which registers with the opposite ends of the elongated bores 71 and 72 and which receives a portion of the driven shaft 74, thus permitting the driven member 83 to be mounted on said driven shaft and to be positively secured thereto by means of a key 87 which is secured in a keyway 88 to prevent relative rotation between the driven member 83 and the periphery of the driven shaft 74. Therefore, as the rotation of the drive shaft 51 causes the concomitant rotation of the housing 54 of the transmission unit 51 and the drive member 60 thereof, the driven member 83, which is fluidly coupled to the drive member 60 of said transmission, is simultaneously rotated, causing the concomitant rotation of the driven shaft 74 and the projecting opposite ends 76 and 77 thereof.

To prevent the possibility of leakage from the interior of the housing 54 of the transmission unit 15, there is provided between adjacent surfaces of the driving and driven members 60 and 83 a first sealing means 90, said first sealing means being constituted, in part, by a wear plate 92 inserted in a recess in the driven member 83 and having its face engageable by a spring biased sealing element 94 inserted in a recess in the driving member 60. The first sealing means 90 thus prevents fluid in the interior of the housing 54 from flowing between the contiguous faces of the driving and driven members 60 and 83, respectively, by sealing the space between these members and preventing the efflux of fluid from the interior of the housing 54 along the periphery of the driven shaft 74.

Second sealing means 96 is provided between the elongated portion 85 of the driven member 83 and the interior of the housing segment 55 to prevent leakage from the interior of the housing 54 through the bore 71 in the drive shaft 51. The second sealing means 96 is constituted, in part, by a wear plate 98 disposed in a recess in the elongated portion 85 of the driven member 83 and having a face engageable by a spring biased sealing member 101. The provision of the first sealing means together with the second sealing means eliminates the possibility of leakage from the interior of the transmission unit housing 54 along the driven shaft 74 and the possible loss of the fluid incorporated in said housing.

It will be noted that the drive motor 13 and the transmission 15 have their axes of rotation coincident with each other, the driven shaft 74 extending through both the drive motor 13 and the transmission unit 15 to provide the opposite ends 76 and 77 which project from the opposite ends of the housing 11 of the power unit 10, thus permitting the torque transmitted through the driven shaft 74 to be carefully controlled and stopped when so desired and achieving results not attainable by prior art constructions.

I claim as my invention:

1. In a power unit, the combination of: an elongated, substantially cylindrical unit housing; first and second end bells secured to the opposite ends of said unit housing, each of said end bells being provided with an axial bore and having first and second bearing seats encompassing said bore; first and second bearing means disposed, respectively, in said first and second bearing seats; an elongated, hollow drive shaft having an end disposed in said first bearing means in said first end bell and a rotatable transmission housing formed integrally with its other end, said transmission housing being journaled in said first bearing in said second end bell and having a drive rotor connected thereto; an elongated driven shaft extending through said drive shaft and said transmission housing and having its opposite ends journaled in said second bearings in said first and second end bells and projecting beyond said end bells; and a driven rotor in said transmission housing secured to said driven shaft.

2. In a power unit, the combination of: an elongated, substantially cylindrical unit housing; first and second end bells secured to the opposite ends of said unit housing, each of said end bells being provided with an axial bore and having first and second bearing seats encompassing said bore; first and second bearing means disposed, respectively, in said first and second bearing seats; an elongated, hollow drive shaft having an end disposed in said first bearing means in said first end bell and a rotatable transmission housing formed integrally with its other end, said transmission housing enclosing a driving and a driven rotor, said rotors having sealing means disposed between the opposite faces thereof, said transmission housing being in driving relationship with said driving rotor, and being journaled in said first bearing in said second end bell; and an elongated driven shaft in driven relation with said driving rotor and extending through said drive shaft and said transmission housing, said driven shaft having its opposite ends journaled in said second bearings in said first and second end bells and projecting beyond said end bells.

3. In a power unit, the combination of: an elongated, substantially cylindrical unit housing; first and second end bells secured to the opposite ends of said unit housing, each of said end bells being provided with an axial bore and having first and second bearing seats encompassing said bore; first and second bearing means disposed, respectively, in said first and second bearing seats; an elongated, hollow drive shaft having an end disposed in said first bearing means in said first end bell and a rotatable transmission housing formed integrally with its other end, said transmission housing enclosing a driving and a driven rotor, said rotors having sealing means disposed between the opposite faces thereof, said transmission housing being in driving relationship with said driving rotor, and being journaled in said first bearing in said second end bell; an elongated driven shaft in driven relation with said driving rotor and extending through said drive shaft and said transmission housing, said driven shaft having its opposite ends journaled in said second bearings in said first and second end bells and projecting beyond said end bells; and second sealing means interposed between said driven rotor and said transmission housing and encompassing said driven shaft.

4. In a power unit, the combination of: a unit housing of substantially cylindrical configuration having first and second end bells secured to the opposite ends thereof, each of said end bells being provided with an axial bore and first and second bearing seats; first and second bearing means disposed respectively in said first and second bearing seats; a transmission housing disposed internally of said unit houing at one end thereof and having an elongated hollow drive shaft formed integrally therewith at one end thereof and a short hollow journal hub formed integrally with the opposite end thereof, said drive shaft and said hub being supported for rotation respectively in the first bearings in said first and second end bells; an electric motor armature fixedly mounted on said drive shaft and positioned in an electric field for rotating said transmission housing, said transmission housing having a drive rotor connected thereto and a driven rotor located therein; and an elongated driven shaft mounting said driven rotor and extending through said drive shaft and said hub and having its opposite ends journaled in said second bearings in said first and second end bells and extending beyond said end bells.

5. In a power unit, the combination of: a unit housing of substantially cylindrical configuration having first and second end bells secured to the opposite ends thereof, each of said end bells being provided with an axial bore and first and second bearing seats; first and second bearing means disposed respectively in said first and second bearing seats; a transmission housing disposed internally of said unit housing at one end thereof and having an elongated hollow drive shaft formed integrally therewith at one end thereof and a short hollow journal hub formed integrally with the opposite end thereof, said drive shaft and said hub being supported for rotation respectively in the first bearings in said first and second end bells, said transmission housing enclosing a driving rotor connected to said transmission housing and a driven rotor; an electric motor armature fixedly mounted on said drive shaft and positioned in an electric field for rotating said transmission housing; an elongated driven shaft connected to said driven rotor and extending through said drive shaft and said hub and having its opposite ends journaled in said second bearings in said first and second end bells and extending beyond said end bells; and sealing means interposed between said driving and driven rotors and encompassing the periphery of said driven shaft for preventing leakage of fluid from the interior of said transmission housing.

6. In a power unit, the combination of: a unit housing of substantially cylindrical configuration having first and second end bells secured to the opposite ends thereof, each of said end bells being provided with an axial bore and first and second bearing seats; first and second bearing means disposed respectively in said first and second bearing seats; a transmission housing disposed internally of said unit housing at one end thereof and having an elongated hollow drive shaft formed integrally therewith at one end thereof and a short hollow journal hub formed integrally with the opposite end thereof, said drive shaft and said hub being supported for rotation respectively in the first bearings in said first and second end bells, said transmission housing enclosing a driving rotor connected thereto and a driven rotor; an electric motor armature fixedly mounted on said drive shaft and positioned in an electrical field for rotating said transmission housing; an elongated driven shaft mounting said driven rotor and extending through said drive shaft and said hub and having its opposite ends journaled in said second bearings in said first and second end bells and extending beyond said end bells; first sealing means interposed between said driving and driven rotors and encompassing the periphery of said driven shaft for preventing leakage of fluid from the interior of said transmission housing; and second sealing means interposed between the end of said driven rotor and said transmission housing to prevent leakage of fluid from the interior of said transmission housing through said hollow drive shaft.

7. In a power unit, the combination of: a unit housing of substantially cylindrical configuration having first and second end bells secured to the opposite ends thereof, each of said end bells being provided with an axial bore and first and second bearing seats; first and second bearing means disposed respectively in said first and second bearing seats; a field coil disposed within and at one end of said unit housing; a transmission housing having one end disposed within one end of said field coil and having an elongated hollow drive shaft formed integrally with said one end and a short hollow journal hub formed integrally with the opposite end thereof, said drive shaft and said hub being supported for rotation respectively in the first bearings in said first and second end bells; a drive rotor connected to said transmission housing and a driven rotor juxtaposed to said drive rotor; an electric motor armature fixedly mounted on said drive shaft for rotating said transmission housing; and an elongated driven shaft connected to said driven rotor and extending through said drive shaft and said hub and having its opposite ends journaled in said second bearings in said first and second end bells and extending beyond said end bells.

8. In a power unit, the combination of: a unit housing of substantially cylindrical configuration having first and second end bells secured to the opposite ends thereof, each of said end bells being provided with an axial bore and first and second bearing seats; first and second bearing means disposed respectively in said first and second bearing seats; a field coil disposed within and at one end of said unit housing; a transmission housing having one end disposed within one end of said field coil and having an elongated hollow drive shaft formed integrally with said one end and a short hollow journal hub formed integrally with the opposite end thereof, said drive shaft and said hub being supported for rotation respectively in the first bearings in said first and second end bells, said transmission housing enclosing a driving rotor connected thereto and a driven rotor; an electric motor armature fixedly mounted on said drive shaft for rotating said transmission housing; an elongated driven shaft connected to said driven rotor and extending through said drive shaft and said hub and having its opposite ends journaled in said second bearings in said first and second end bells and extending beyond said end bells; and sealing means interposed between said driving and driven rotors and encompassing the periphery of said driven shaft for preventing leakage of fluid from the interior of said transmission housing.

9. In a power unit, the cominbation of: a unit housing of substantially cylindrical configuration having first and second end bells secured to the opposite ends thereof, each of said end bells being provided with an axial bore and first and second bearing seats; first and second bearing means disposed respectively in said first and second bearing seats; a field coil disposed within and at one end of said unit housing; a transmission housing having one end disposed within one end of said field coil and having an elongated hollow drive shaft formed integrally with said one end and a short hollow journal hub formed integrally with the opposite end thereof, said drive shaft and said hub being supported for rotation respectively in the first bearings in said first and second end bells, said transmission housing enclosing a driving rotor connected thereto and a driven rotor; an electric motor armature fixedly mounted on said drive shaft for rotating said transmission housing; an elongated driven shaft connected to said driven rotor and extending through said drive shaft and said hub and having its opposite ends journaled in said second bearings in said first and second end bells and extending beyond said end bells; first sealing means interposed between said driving and driven rotors and encompassing the periphery of said driven shaft for preventing leakage of fluid from the interior of said transmission housing; and second sealing means interposed between the end of said driven rotor and said transmission housing to prevent leakage of fluid from the interior of said transmission housing through said hollow drive shaft.

References Cited in the file of this patent

UNITED STATES PATENTS

| | | |
|---|---|---|
| 1,389,562 | Schneider | Aug. 30, 1921 |
| 2,101,606 | Ayres | Dec. 7, 1937 |
| 2,380,595 | Hertrich | July 31, 1945 |
| 2,418,362 | Miller | Apr. 1, 1947 |
| 2,457,692 | La Brie | Dec. 28, 1948 |